(12) United States Patent
Kreinbrink

(10) Patent No.: US 9,019,734 B2
(45) Date of Patent: Apr. 28, 2015

(54) SOLID STATE SWITCH GATE FIRING WITH PHASE SHIFT DELAY LINE

(75) Inventor: Joseph V. Kreinbrink, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2176 days.

(21) Appl. No.: 11/888,288

(22) Filed: Jul. 31, 2007

(65) Prior Publication Data

US 2009/0033266 A1 Feb. 5, 2009

(51) Int. Cl.
*H02M 7/17* (2006.01)
*H02P 6/14* (2006.01)

(52) U.S. Cl.
CPC .................................. *H02P 6/142* (2013.01)

(58) Field of Classification Search
USPC .................. 363/67–70, 87, 129, 89
See application file for complete search history.

(56) References Cited

U.S. PATENT DOCUMENTS

| | | | | |
|---|---|---|---|---|
| 4,429,357 A | * | 1/1984 | Hausler et al. | 363/68 |
| 4,864,487 A | * | 9/1989 | Schnetzka et al. | 363/129 |
| 5,050,058 A | * | 9/1991 | April et al. | 363/65 |
| 5,923,550 A | * | 7/1999 | Kumar | 363/69 |
| 6,594,164 B2 | * | 7/2003 | Suzuki | 363/69 |
| 7,148,661 B2 | * | 12/2006 | Trainer et al. | 323/207 |
| 2007/0080728 A1 | * | 4/2007 | Iwata | 327/156 |
| 2008/0303501 A1 | * | 12/2008 | Prodic | 323/283 |

* cited by examiner

*Primary Examiner* — Fred E Finch, III
(74) *Attorney, Agent, or Firm* — Fletcher Yoder P.C.

(57) ABSTRACT

A gate firing phase shift delay line technique is described for use in DC motor drive systems and is easily adaptable for controlling a plurality of electronically coupled power modules. A drive regulator is configured to produce a master gate firing timing signal for controlling the gate firing pattern of switching devices for a first power module. One or more delay blocks are configured to generate slave gate firing timing signals that are phase locked and identical but delayed in time with respect to the master signal. Each additional delay block is coupled to an additional power module having a set of switching devices controllable by the slave signals. The current output of each power module is summed via summing circuitry to deliver an output suitable to drive motors or other electrical loads in high power applications. The power modules can also be connected in series to combine (sum) the voltages for delivery to an electrical load. The present technique allows for DC motor drive systems to be tuned to a higher bandwidth level due to increased stability, resulting in increased drive performance and production speed.

25 Claims, 6 Drawing Sheets

SOLID STATE SWITCH GATE FIRING WITH PHASE SHIFT DELAY LINE

BACKGROUND

The present invention relates generally to the field of DC drive systems and, in certain embodiments, DC drive systems for delivering current to drive a motor or for other DC power module applications, such as a DC bus supply for an AC inverter drive or a DC power module, as well as for various other applications, such as electroplating.

DC drive systems generally include a drive regulator coupled to a power module. The power module may be configured as a plurality of switching devices. The drive regulator generates gate firing timing pulses based on a condition detectable by detection circuitry. For example, the drive regulator may generate gate firing timing pulses based on the desired control of motor current, torque, speed or shaft position and the zero crossings of an AC line input. The AC line zero crossings are detected to establish the exact firing time of the power devices (e.g. SCRs) relative to the AC line. The gate firing timing pulses drive the switching devices in the power module, thereby generating a direct current output to drive a load, for example a motor.

As high power applications, such as high horsepower motors and large steel rolling mills, have become increasing popular, the demand for higher output DC drive systems has also increased. Along with the increase in horsepower is the demand to control the amount of harmonics generated in the AC power lines along with providing "smooth power" to the motor. The voltage to each of the power modules is phase shifted by means of the power transformers that supply them with power. The phase shift of the voltage between each of the input voltages depends on the topology of the system. In the topology known in the industry as an S12/S12R, the phase shift would be 30 degrees, for an S18/S18R, 20 degrees, whereas an S24/S24R requires 15 degrees, and so forth. One current solution of these DC drive systems is to connect multiple power modules in parallel, with each module being governed by its own drive regulator which regulates an independent current loop and generates a gate firing pattern for each power module. The current between each power module is phase shifted accordingly depending on the number of power modules and the configuration of switching devices in each power module. The output currents of each power module are then combined using summing circuitry (typically an inductor), prior to being delivered to the motor or other DC load.

Although the use of multiple independent drive regulators for controlling multiple power modules in DC drive systems functions adequately, the technique is not without drawbacks. The independent gate firing patterns from each regulator may result in difficulty tuning the drive system due to current instability. When the drive regulators become unstable and/or out of phase with one another, protection circuitry (i.e., circuit breakers and fuses) may engage and shut down the system. Such protective measures, while necessary, are burdensome and hinder production efficiency.

In order to avoid drawbacks of the prior art, there is a need, therefore, for an improved DC motor drive system having more stable tuning features to enable higher bandwidth for increased output and improved drive performance.

BRIEF DESCRIPTION

The present invention provides a novel modular phase shift delay feature for use in DC motor drive systems employing multiple power modules. The phase shift delay feature is designed to replace existing drive regulators that are configured as previously described, used in conventional DC motor drive systems with little or no change to other components of the systems, making it ideal for integration into existing systems. Additionally, the modular aspect of the present technique allows for a DC drive system utilizing the phase shift delay feature to be easily adaptable for controlling a plurality of electronically coupled power modules through a single drive regulator.

The gate firing phase shift delay line approach of the present technique provides an advantage over the prior art by allowing for the flexibility to configure the drive system to meet the needs of various gate drive configurations. For example, in a DC drive system employing a multiple power module configuration, rather than requiring an independent drive regulator for each power module, the present technique requires only a single drive regulator to govern the multiple power modules in order to produce the multi-pulse power output of S12/S12R, S18/S18R, S24/S24R, and similar power modules. First, the drive regulator produces a "master" gate firing timing signal for the first power module. The master signal is then used to derive phase shift delayed "slave" gate firing timing signals for each additional power module. A further advantage of the present technique is that the master and slave signals are phase locked, thereby essentially eliminating the tuning difficulties and instability issues associated with the use of multiple independent drive regulators. As such, setup and tuning will be more straightforward, and circuit breaker trips and clearing fuses will be avoided. The present invention further provides an economic advantage over the prior art in the sense that eliminating the need for additional drive regulators reduces the overall cost of production by decreasing equipment costs and downtime. The innovation allows DC motor drive systems to be tuned to a higher bandwidth level due to the increased stability, resulting in increased drive performance and production speed.

In accordance with embodiments of the present technique, a DC motor drive or DC power module system employing the phase shift delay feature includes a drive regulator, one or more delay blocks, (with each delay block containing a delay line for each gate signal of the power switches, e.g., SCRs,) each delay block being coupled to a respective power module having a set of solid state switching devices. The power modules are substantially identical and may be electronically coupled in parallel, each power module receiving a three phase AC input with a phase shift that is appropriate to the topology of the system (e.g., S12/S12R, S18/S18R, S24/S24R, etc.). The drive regulator includes detection circuitry hardware and software which detect zero crossings of the AC input and combines this information with the reference and feedback variables to generate a set of master gate firing signals. The master set of gate firing signals are connected to the power switching devices of the master power module which has input AC power with a 0 degree phase shift. For each additional power module, a delay block is employed which contains digital delay line gate driver circuits that receive the master gate firing timing signals. Each digital delay line is configured to generate a delayed slave gate firing timing signal by phase shifting the master signals, wherein the degree of phase shift delay is adjustable and determined by the configuration of the power modules and switching devices (e.g., S12/S12R—30 degrees, S18/S18R—20 degrees, S24/S24R—15 degrees, and so forth). Using the slave signals, the gate driver circuitry at the output of each delay block produces delayed gate firing patterns for controlling the switching devices for its respective power module.

Subsequently, the output current from each power module is combined in order to supply multi-pulse power to drive high power applications.

It should also be further noted that although the modular delayed switching method of the present invention is primarily described with respect to DC drive systems having power modules electronically coupled in parallel, the present technique can also be applied to systems having power modules electronically coupled in a series (totem pole) configuration.

DRAWINGS

This and other features, aspects, and advantages of the present invention will become better understood when the following detailed description is read with reference to the accompanying drawings in which like characters represent like parts throughout the drawings, wherein.

DETAILED DESCRIPTION

Figure 1:
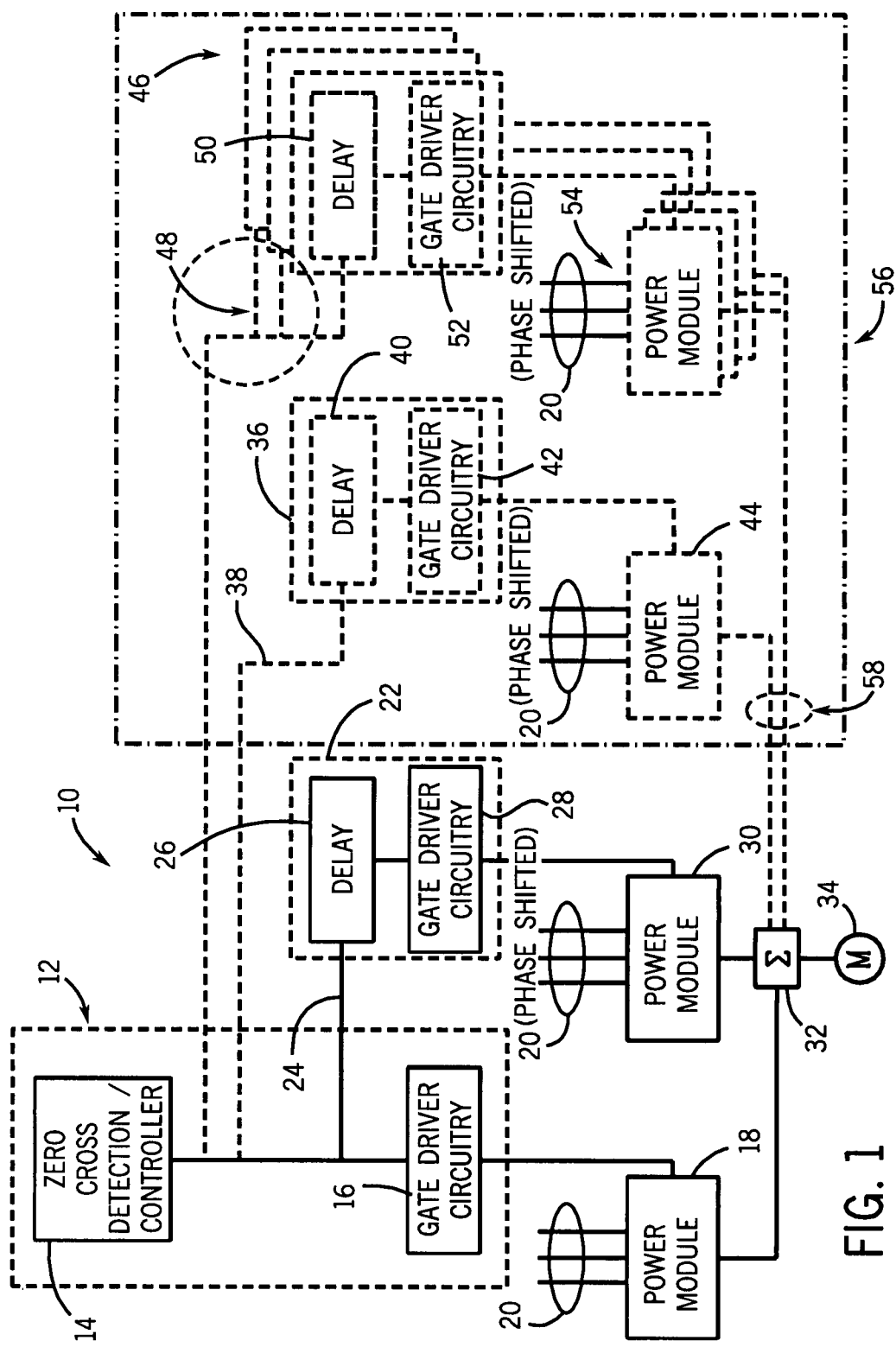
FIG. 1 is a diagrammatical representation of a DC motor drive system having multiple power modules electronically coupled in parallel and employing a gate firing phase shift delay line technique, in accordance with an exemplary embodiment of the invention.

Turning now to the drawings and referring first to FIG. 1, a diagrammatical representation of a DC motor drive system 10 employing a gate firing phase shift delay line technique is illustrated, in accordance with an exemplary embodiment of the invention. A drive regulator 12 is provided and includes zero cross detection circuitry/controller 14 and gate driver circuitry 16. The drive regulator 12 is coupled to a power module 18 which includes a plurality of solid state switching devices (not shown in FIG. 1) and receives a three phase AC input 20. The zero cross detection circuitry/controller 14 is configured to generate a master gate firing timing signal based on zero crossings of the AC input 20 and the system variables that are being controlled. The gate driver circuitry 16 produces, based on the master gate firing timing signal, a gate firing pattern for the switching devices of the power module 18. The gate firing pattern governs which switching devices are switched on during each gate firing pulse in a line cycle. In particular embodiments, as will be illustrated in FIG. 2, the switching devices may be provided by silicon controlled rectifiers (SCRs). However, it will be appreciated by those skilled in the art that other types of solid state switching devices may be employed in practicing the present invention.

The master gate firing timing signal generated by the zero cross detection/controller circuitry 14 is tapped out from the drive regulator 12 by a signal line coupled to a delay block 22, as denoted by reference numeral 24. The delay block 22 includes delay line circuitry 26 for each power switching device being controlled, and gate driver circuitry 28 substantially identical to the gate driver circuitry 16 of the drive regulator 12. The delay line circuitry 26 is configured to phase shift the master gate firing timing signal depending on the configuration of the switching devices of power modules 18 and 30, thereby producing a slave gate firing timing signal that is identical but delayed in time with respect to the master signal. It will be understood by those skilled in the art that the required degree of phase shift in the resulting slave signals will depend on the number of power modules in the drive system 10, and the topology of the system (e.g., S12/S12R, S18/S18R, S24/S24R, etc.). Further, although not depicted in FIG. 1, it will also be appreciated by those skilled in the art that the desired degree of phase shift delay may be set through either hardware (e.g., dials with associated potentiometers devices) or software settings (e.g., firmware).

The delay block 22 is coupled to a second power module 30 substantially identical to the first power module 18 and receiving a three-phase AC input 20 (however, it is phase shifted based on the topology of the system.) Using the slave signal generated by the delay circuitry 26, the gate driver circuitry 28 generates a gate firing pattern for the second power module 30. The resulting delayed gate firing pattern controls which of the switching devices (not shown in FIG. 1) of the power module 30 are switched on during each gate firing pulse. The respective current outputs from the power modules 18 and 30 are summed via summing circuitry, as denoted by reference numeral 32. The resulting total current is then provided to drive a motor 34 (or other electrical load.)

Figure 2:
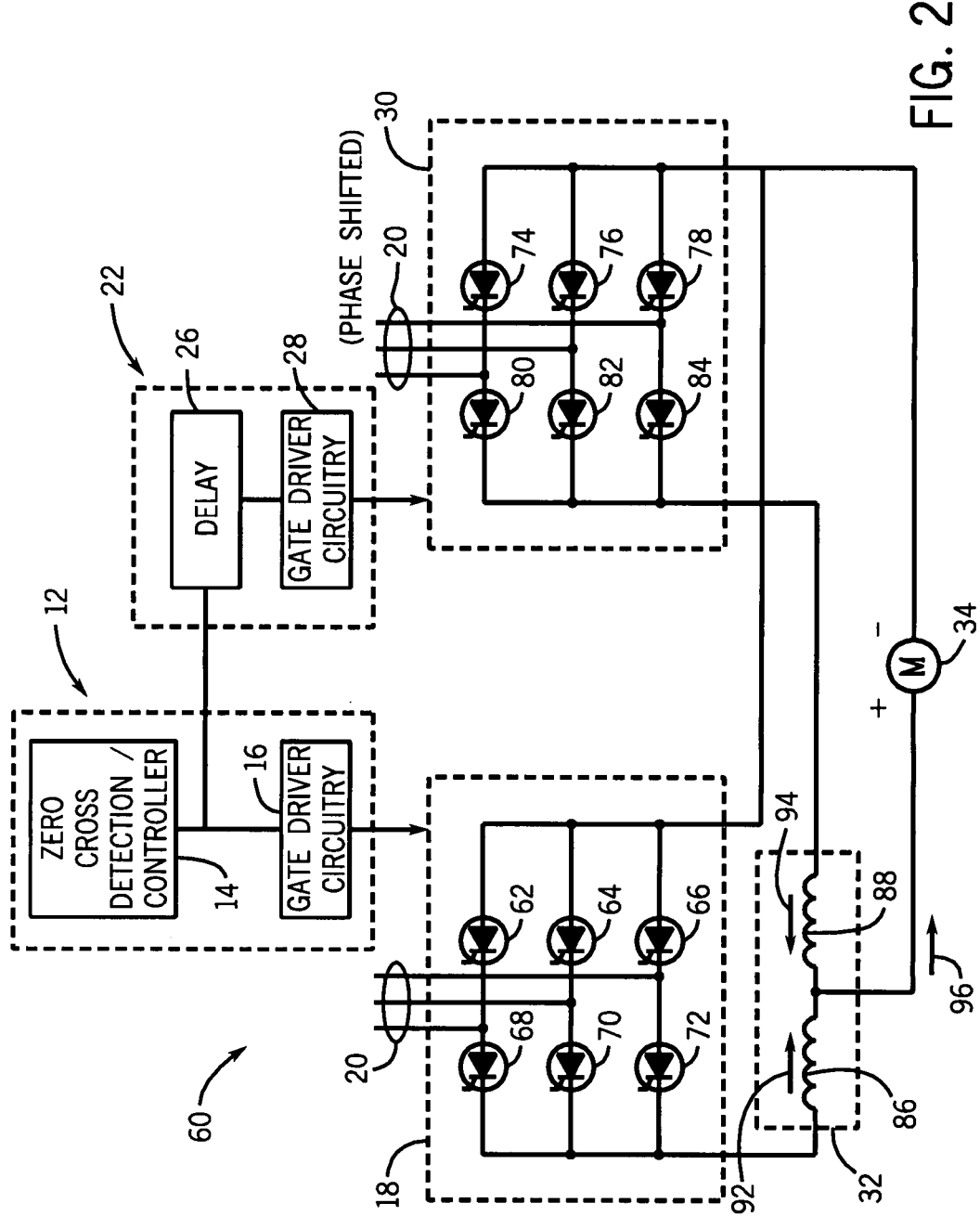
FIG. 2 is a diagrammatical representation illustrating a more detailed view of the DC motor drive system of FIG. 1.

Referring now to FIG. 2, a more detailed diagrammatical representation of a 2-module drive system is illustrated, showing one possible configuration of the switching devices of the power modules 18 and 30, in accordance with an exemplary embodiment of the present technique. For simplicity, like reference numerals have been used to designate those features previously described in FIG. 1. It should be noted that even though only a non-regenerative power module is shown in the diagram (for simplicity,) the gate firing phase shift delay line technique can also be applied to regenerative power module configurations.

As described above with reference to FIG. 1, a master gate firing timing signal is produced via the zero cross detection/controller circuitry 14 of the drive regulator 12. The gate driver circuitry 16 uses the master signal to generate a gate firing pattern for the power module 18. Also, as discussed above, the required degree of phase shift will depend on the number of power modules in the drive system, as well as the number of switching devices per power module. As shown in FIG. 2, the power modules 18 and 30 are each shown as having a configuration of 6 SCR switching devices, respectively SCRs 62, 64, 66, 68, 70, 72 (power module 18) and SCRs 74, 76, 78, 80, 82, 84 (power module 30), for a total of 12 SCR switching devices. The drive regulator 12 provides the master signal to the delay block 22 to generate a slave signal that is identical but delayed in time with respect to the master signal. Based on this configuration of the power modules in FIG. 2, it will be understood by those of ordinary skill in the art that an appropriate degree of phase shift delay between the master and slave signals is 30 degrees. Thus, the resulting output current 94 from the power module 30 will be 30 degrees out of phase with respect to the output current 92 from the power module 18.

The two output currents 92 and 94 are summed by summing circuitry 32. As illustrated in FIG. 2, the summing circuitry 32 may be embodied by a pair of inductors 86 and 88. The resulting total current 96 is then supplied to drive the motor 34. Furthermore, while FIG. 2 illustrates a 2-module DC drive system, it will be appreciated by those skilled in the art that the delay time could be adjusted to yield other configurations beyond the 2-module/12-switching device system, as will be described in more detail below.

Referring now back to FIG. 1, in order to more clearly demonstrate the modular feature of the present invention, additional power modules and delay blocks, denoted by reference numeral 56, are provided to illustrate that the drive system 10 is easily adaptable to include additional power modules and delay blocks for increased current output and performance. The drive system 10 may include an additional delay block 36, or a plurality of additional delay blocks 46, each delay block having additional respective delay circuitry 40 and 50 and additional respective gate driver circuitry 42 and 52. Each additional delay block 36 and 46 is respectively coupled to additional power modules 44 and 54 that are substantially identical to the power modules 18 and 30 and receive a three phase AC input that is phase shifted relative to the master AC input 20 and is dependent on the system topology, (e.g., S12/S12R, S18/S18R, S24/S24R, etc.). The voltage to each of the power modules is phase shifted by means of the power transformers that supply them with power. The phase shift between each of the input voltages depends on the topology of the system. In the topology known in the industry as an S12/S12R, the phase shift would be 30 degrees, for an S18/S18R, 20 degrees, for an S24/S24R, 15 degrees, and so forth.

The additional delay blocks 36 and 46 are configured to operate in a manner substantially identical to delay block 22. Specifically, the additional delay blocks 36 and 46 each receive the master gate firing timing signal from the drive regulator 12, as respectively denoted by the additional signal lines 38 and 48. Furthermore, through their respective delay circuitry elements 40 and 50, each delay block produces slave gate firing timing signals that are identical but delayed in time with respect to the master signal. The slave signals are then provided to the respective additional gate driver circuitry 42 and 52 to generate gate firing patterns for their respective additional power modules 44 and 54. The current outputs 58 from the additional power modules 44 and 54 are summed along with the outputs from the power modules 18 and 30 via summing circuitry 32. The resulting total current is then provided to drive the motor 34 (or other electrical load).

Although functionally and structurally similar, the primary difference between each of the additional delay blocks 36 and 46 is the configuration of the delay circuitry elements 40 and 50 for imparting a phase shift delay to the master gate firing timing signal to create the delayed slave signals. As described above with reference to FIG. 2, where a drive system is embodied by a 2-module/S12-SCR switching device drive system, the delay circuitry 26 is configured to produce a 30 degree phase shift delay between the power modules 18 and 30. By way of example, if the drive system of FIG. 2 is expanded to include an additional delay block 36 and an additional power module 44, the result will be a 3-module/S18-SCR switching device drive system. As such, the delay times will be adjusted accordingly, wherein the delay blocks 26 and 36 are configured to produce slave signals phase shift delayed by 20 and 40 degrees respectively. Accordingly, the output currents of the power modules 30 and 44 will be respectively 20 and 40 degrees out of phase with respect to the output of the power module 18. Similarly, if the drive system is further expanded to a 4-module/S24-SCR switching device drive system, the output from the power modules will be respectively 15, 30 and 45 degrees out of phase with respect to the output of the power module 18.

Figure 3:
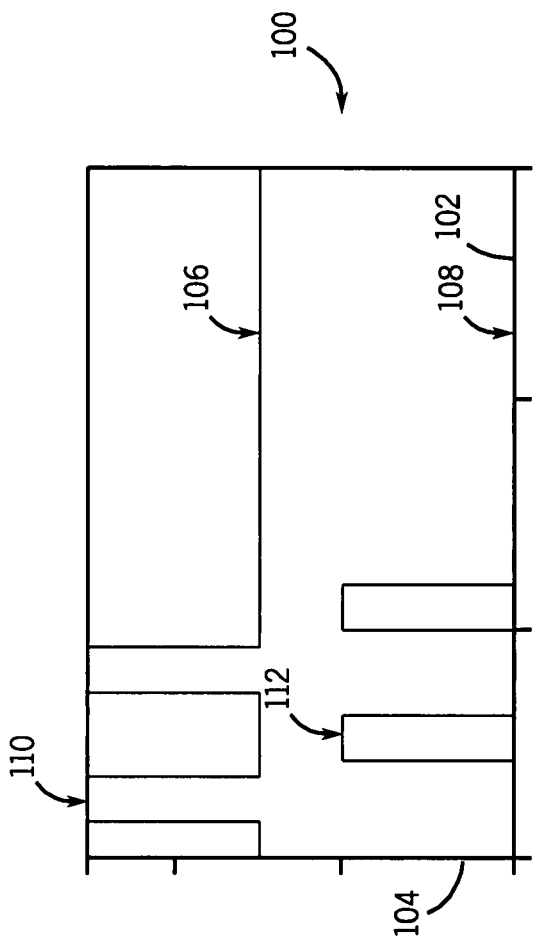
FIG. 3 is a timing diagram illustrating a master gate firing pulse and its corresponding phase shift delayed gate firing pulse.

FIG. 3 shows a timing diagram 100 illustrating a portion of a master gate firing timing signal 106 and its corresponding phase shift delayed signal 108. The X and Y axes of the timing diagram 100 respectively represent time 102 and the amplitude of the gate firing pulses 104. As described above, the zero cross detection and controller circuitry 14 produces a master gate firing timing signal, denoted by trace line 106, which is tapped out to one or more delay blocks. Each delay block includes delay circuitry configured to phase shift the master signal 106 to produce a slave signal 108 that is identical but delayed in time with respect to the master signal 106. For example, as illustrated in the timing diagram 100, a gate firing pulse 112 of the slave signal 108 is delayed with respect to the gate firing pulse 110 of the master signal 106.

Figure 4:
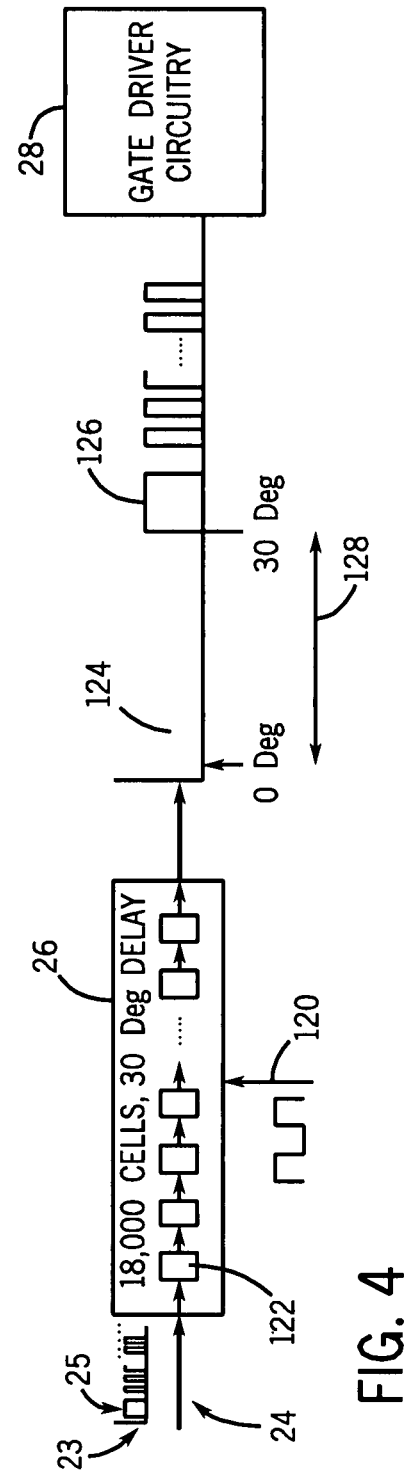
FIG. 4 is a diagrammatical representation of the digital delay circuitry employed by the DC motor drive system of FIG. 2.

The delay circuitry 26 described in FIGS. 1 and 2 may be provided by a digital delay line, as illustrated in FIG. 4. It should be noted that FIG. 4 illustrates a 30 degree delay that would be required for an S12/S12R topology. Other delays would be used by other topologies (e.g., S18/S18R—20 degrees, S24/S24R—15 degrees, etc.) between each power module's gate signals. The digital delay line comprises a plurality of delay cells 122 (e.g., delay flip-flops or memory cells), wherein each cell is configured to time shift an input signal by a finite time interval. In exemplary embodiments, the digital delay line may be implemented in a field programmable gate array (FPGA). The FPGA may further include a phase locked loop (PLL) that is synchronized with the AC source signal 20 to minimize jitter distortion. Furthermore, the PLL may be normalized with respect to the AC frequency 20 to provide a normalized delay count. By way of example, the PLL count may be normalized to an AC frequency of 50 Hz or 60 Hz, such that 1 degree of phase shift has a weight of 600 delay counts, wherein the count is controlled by a PLL clock signal 120. As such, a 30 degree phase shift will require passing the master gate firing timing signal through 18,000 delay cells. As described above, the phase locking feature provides a novel advantage by eliminating the instability and tuning difficulties encountered in DC motor drive systems having multiple gate firing signals generated by multiple drive regulators. This feature can be tuned to an even higher precision by increasing the frequency of the PLL and the number of delay cells.

The resulting output from the digital delay line is a slave gate firing timing signal 124 that is identical but delayed in time with respect to the master signal 23. For example, the gate firing pulse 126 of the slave signal 124 corresponds to the gate firing pulses 25 of the master signal 23, but is delayed by a 30 degree phase shift, as denoted by reference numeral 128. Based on the resulting slave signal 124, the gate driver circuits 28 generate a gate firing pattern to control the switching devices for its respective power module.

Figure 5:
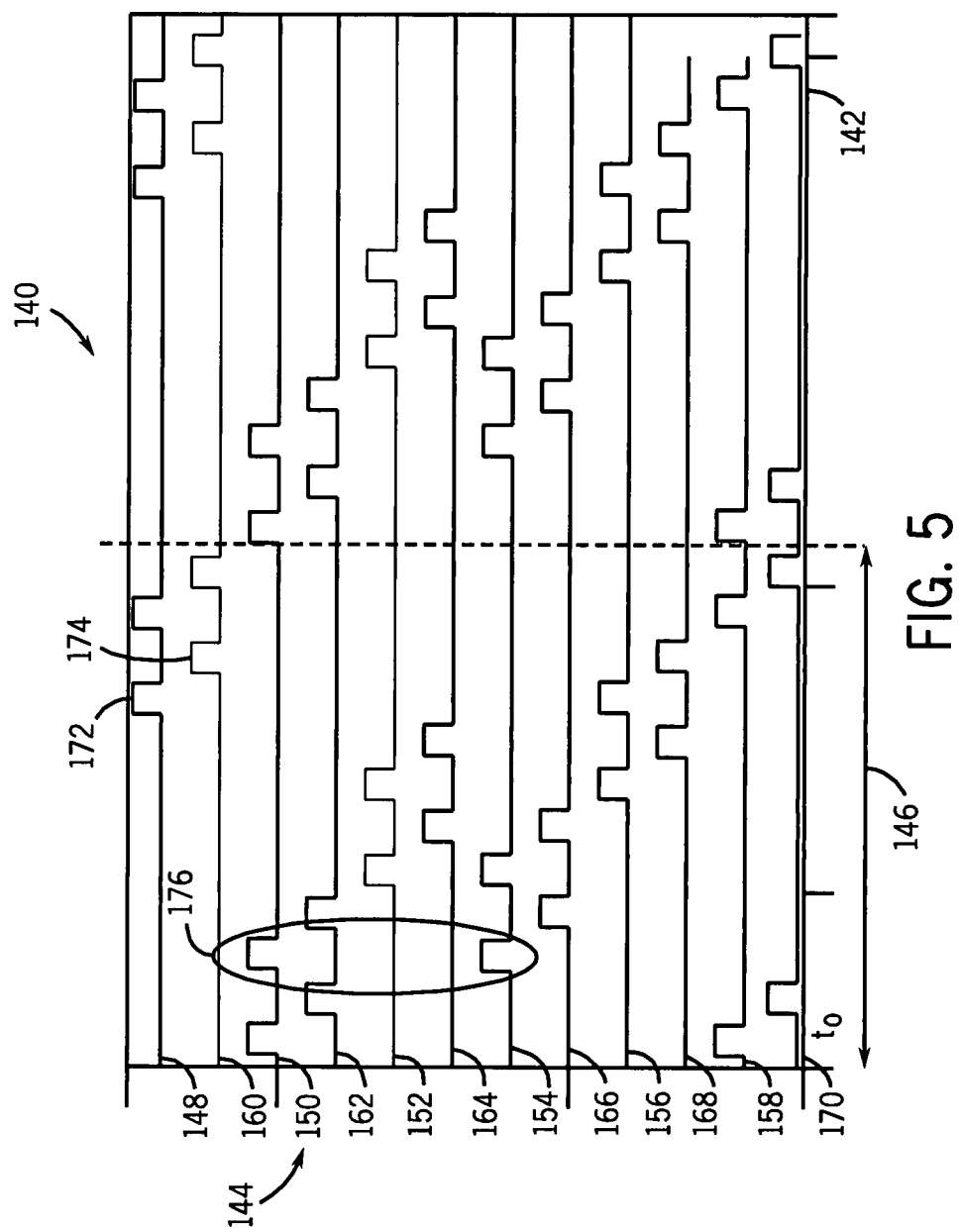
FIG. 5 is a timing diagram illustrating the master gate firing pulses and their respective delayed gate firing pulses corresponding to the switching devices of the DC motor drive system of FIG. 2.

FIG. 5 shows a timing diagram 140 similar to FIG. 3, but illustrating two line cycles of gate firing patterns for each of the 12 SCRs illustrated in FIG. 2. The X and Y axes respectively represent time 142 and the amplitude 144. In the timing diagram 140, the signal traces 148, 150, 152, 154, 156, 158 represent gate firing pulses respectively corresponding to the SCRs 62, 64, 66, 68, 70, 72 of the power module 18. Similarly, the signal traces 160, 162, 164, 166, 168, 170 represent the 30 degree phase shift delayed gate firing pulses respectively corresponding to the SCRs 74, 76, 78, 80, 82, 84 of the power module 30. To provide an example, SCR 62 of the power module 18 receives a gate firing pulse, denoted by reference numeral 172 on signal trace 148. The signal trace 160 for the corresponding delayed SCR 74 is identical to the signal trace 148 but delayed in time by a 30 degree phase shift. The resulting delayed gate firing pulse corresponding to the master pulse 172 is illustrated by reference numeral 174.

Moreover, based on the configuration of the power modules 18 and 30, as shown in FIG. 2, during a single line cycle 146, each SCR 62, 64, 66, 68, 70, 72 and its corresponding delayed SCR 74, 76, 78, 80, 82, 84 receives two gate pulses and is switched on a total of two times. Additionally, during each gate pulse, two SCRS from the power module 18 are switched on simultaneously and, similarly, during each delayed gate pulse, two SCRs from the power module 30 are switched on simultaneously. By way of example, both SCRs 64 and 68 of the power module 18 are switched on during the second gate firing pulse 176 of the line cycle 146, as shown on the signal trace lines 150 and 154. The corresponding delayed gate pulses corresponding to the SCRs 76 and 80 of power module 30 are shown on the signal trace lines 162 and 166.

Figure 6:
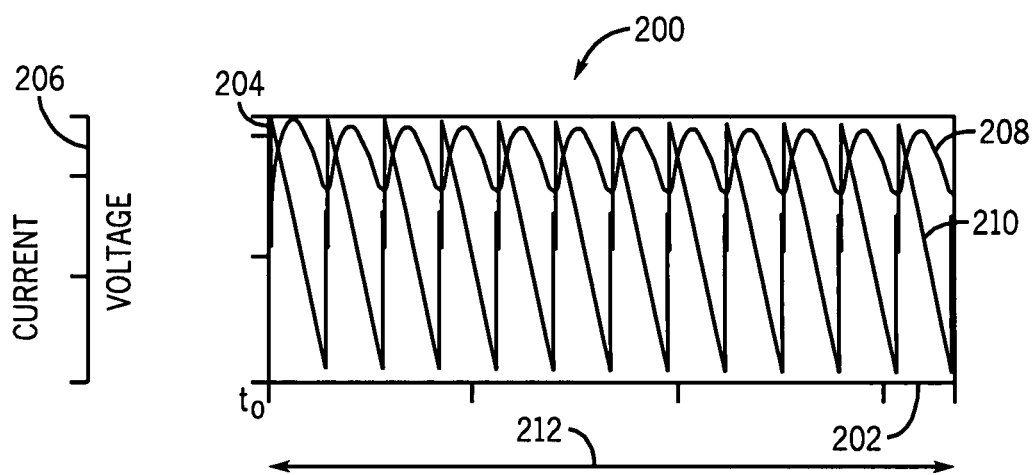
FIG. 6 is a graph showing the current and voltage outputs corresponding to a single line cycle of the DC motor drive system of FIG. 2.

FIG. 6 is a graph 200 showing the current and voltage output expected during a single line cycle 212 of the DC drive system of FIG. 2. The graph 200 includes an X axis representing time 202 and Y axes representing both voltage 204 and current 206. The current output over a single line cycle 212 is illustrated by the trace line 208. Additionally, the voltage output over a single line cycle 212 is illustrated by the trace line 210.

Figure 7:
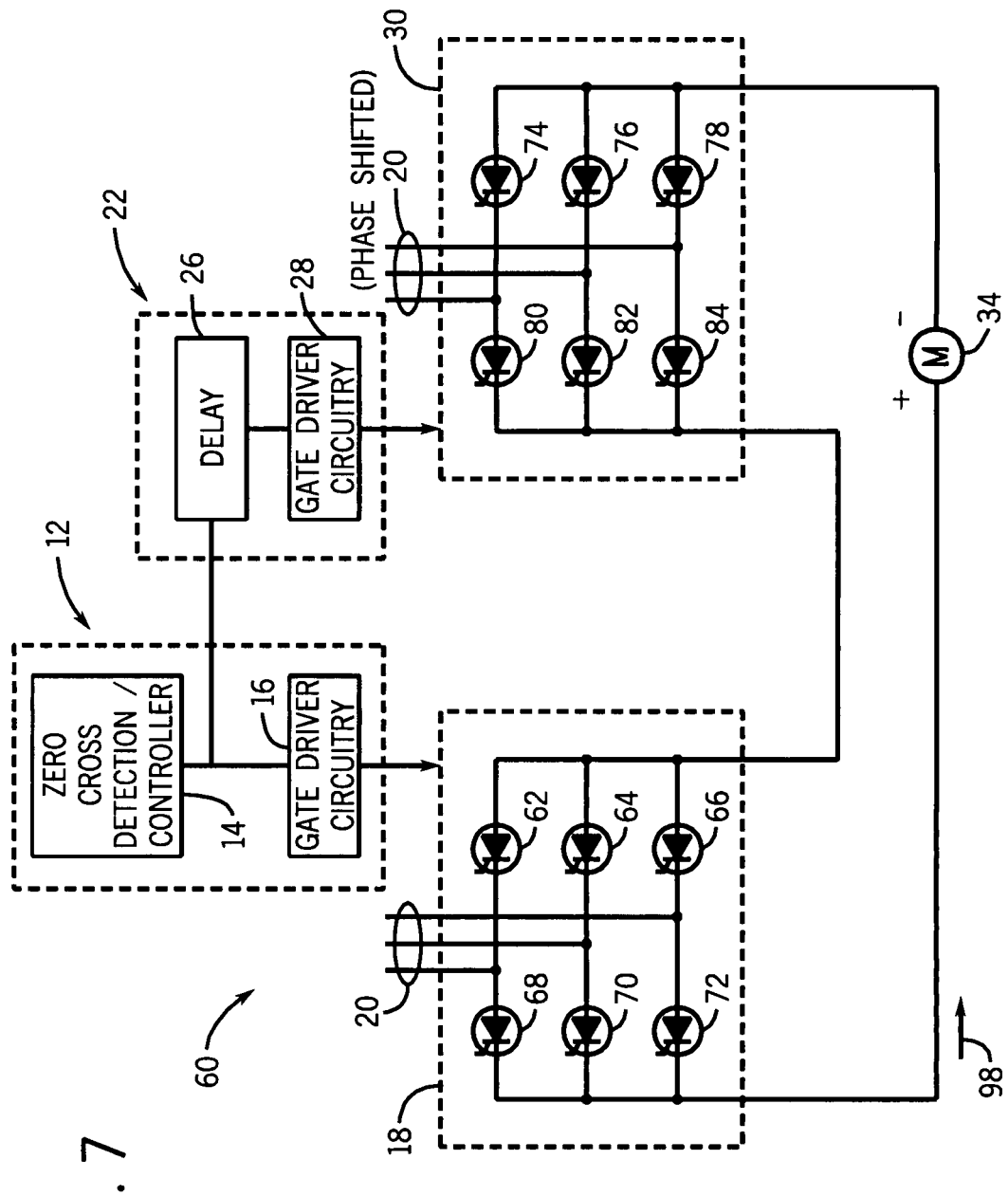
FIG. 7 is a diagrammatical representation of a DC motor drive system employing a modular delayed switching technique and having multiple power modules electronically coupled in series, in accordance with an exemplary embodiment of the invention.

FIG. 7 is a diagrammatical representation of a DC motor drive system employing the gate firing phase shift delay line technique as depicted in FIG. 2, but further illustrating how the technique can be applied to drive systems having power modules electronically coupled in series (totem pole configuration), in accordance with an exemplary embodiment of the invention. For simplicity of description, like reference numerals have been used to designate features previously described in reference to FIG. 2. Furthermore, it can be assumed that the drive regulator 12 and the delay block 22 operate in a substantially identical manner as described in FIG. 2.

As illustrated in FIG. 7, the power modules 18 and 30 are electronically coupled in series. The primary difference between the parallel power module configuration of FIG. 2 and the series power module configuration of FIG. 7 is the absence of summing circuitry 32 in the latter. In the series configuration, rather than summing the output currents from each power module 18 and 30, the output from power module 18 is the total current output 98 and is provided to drive the motor 34, (or other electrical load). Additionally, in the series configuration, the voltage across the motor 34 is equivalent to the sum of the voltage across power module 18 and the voltage across power module 30.

Figure 8:
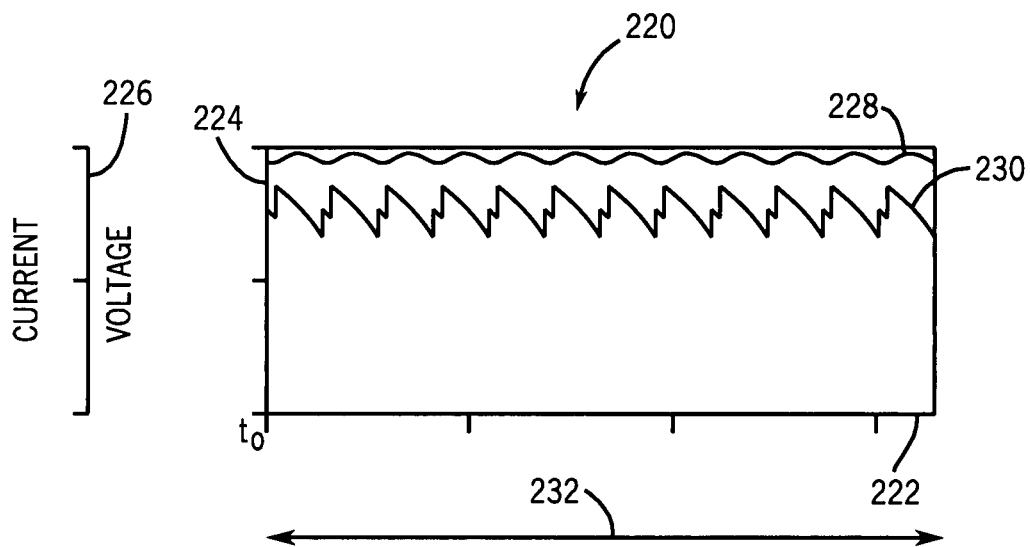
FIG. 8 is a graph showing the current and voltage outputs corresponding to a single line cycle of the DC motor drive system of FIG. 7.

FIG. 8 is a graph 220 showing the current and voltage output expected from a single line cycle 232 of the DC motor drive system of FIG. 7. The graph 220 includes an X axis representing time 222 and Y axis representing both voltage 224 and current 226. The current output for the series DC drive system over a single line cycle 232, is illustrated by the trace line 228. Additionally, the voltage output over a single line cycle 232 is illustrated by the trace line 230.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for controlling an electrical load, comprising:
a first set of solid state switches controllable to convert AC power to DC power;
a regulator coupled to the first set of switches and configured to detect zero crossings of the AC power and system control variables and to generate drive signals for the first set of switches based upon zero crossings of the AC power and system control variables;
a second set of solid state switches controllable to convert the AC power to DC power;
a gate firing phase shift delay line device having a digital delay line and being coupled to the regulator and configured to generate drive signals for the second set of switches based upon the zero crossings and system control variables but delayed in time with respect to the drive signals for the first set of switches; and
means for combining DC power from the first and second sets of switches and for applying the DC power to a load;
wherein the second set of switches is switched at times that do not correspond to the zero crossings of the AC power.

2. The system of claim 1, wherein each set of switches includes 6 switches, and the drive signals for the second set of switches are delayed by 30 degrees with respect to the drive signals for the first set of switches.

3. The system of claim 1, wherein the solid state switches are silicon controlled rectifiers.

4. The system of claim 3, wherein timing for the drive signals is determined based upon a desired output voltage.

5. The system of claim 1, wherein the first and second sets of switches are electrically coupled in parallel, and DC power from the first and second sets of switches is combined via a set of reactors.

6. The system of claim 1, comprising a third set of solid state switches and a second delay line device coupled to the third set of solid state switches and to the regulator and delay line device, the second delay line device being configured to generate drive signals for the third set of switches based upon a the zero crossings but delayed in time with respect to the drive signals for the first and second sets of switches.

7. The system of claim 6, wherein each set of switches includes 6 switches, and the drive signals for the second and third sets of switches are delayed by 20 and 40 degrees, respectively, with respect to the drive signals for the first set of switches.

8. The system of claim 6, comprising a fourth set of solid state switches and a third delay line device coupled to the fourth set of solid state switches and to the regulator and delay line devices, the third delay line device being configured to generate drive signals for the fourth set of switches based upon a the zero crossings but delayed in time with respect to the drive signals for the first, second and third sets of switches.

9. The system of claim 8, wherein each set of switches includes 6 switches, and the drive signals for the second, third and fourth sets of switches are delayed by 15, 30 and 45 degrees, respectively, with respect to the drive signals for the first set of switches.

10. The system of claim 1, wherein the first and second sets of switches are electrically coupled in series.

11. A method for controlling an electrical load, comprising:
controlling a first set of solid state switches to convert AC power to DC power via a regulator coupled to the first set of switches and configured to detect zero crossings of the AC power and system control variables to generate drive signals for the first set of switches;

controlling a second set of solid state switches to convert AC power to DC power via a gate firing phase shift delay line device having a digital delay line, wherein the gate firing phase shift delay line device is coupled to the regulator and configured to generate drive signals for the second set of switches based upon the zero crossings and system control variables but delayed in time with respect to the drive signals for the first set of switches, such that the second set of switches is switched at times that do not correspond to the zero crossings of the AC power;

combining DC power from the first and second sets of switches; and applying the combined DC power to a load.

12. The method of claim 11, wherein each set of switches includes 6 switches, and the drive signals for the second set of switches are delayed by 30 degrees with respect to the drive signals for the first set of switches.

13. The method of claim 11, further comprising controlling a third set of solid state switches via a second delay line device coupled to the third set of solid state switches and to the delay line device, the second delay line device being configured to generate drive signals for the third set of switches based upon the AC power zero crossings and system control variables of the regulator but delayed in time with respect to the drive signals for the first and second sets of switches.

14. The method of claim 13, wherein each set of switches includes 6 switches, and the drive signals for the second and third sets of switches are delayed by 20 and 40 degrees, respectively, with respect to the drive signals for the first set of switches, and wherein DC power from the first, second and third sets of switches is combined.

15. The method of claim 13, further comprising controlling a fourth set of solid state switches via a third delay line device coupled to the fourth set of solid state switches to generate drive signals for the fourth set of switches based upon the AC line zero crossings and system control variables of the regulator but delayed in time with respect to the drive signals for the first, second and third sets of switches.

16. The method of claim 15, wherein each set of switches includes 6 switches, and the drive signals for the second, third and fourth sets of switches are delayed by 15, 30 and 45 degrees, respectively, with respect to the drive signals for the first set of switches, and wherein DC power from the first, second, third and fourth sets of switches is combined.

17. The method of claim 11, wherein the DC power is combined via the first and second sets of switches electrically coupled in series.

18. A system for controlling a motor, comprising:
a first set of solid state switches controllable to convert AC power to DC power;
a regulator including zero cross and control circuitry configured to detect zero crossings of the AC power and system control variables, and drive control circuitry coupled to the zero cross and control circuitry and configured to generate drive signals for the first set of solid state switches based upon the zero crossings and system control variables;
a second set of solid state switches controllable to convert AC power to DC power;
a gate firing phase shift delay line device coupled to the regulator and including digital delay circuitry coupled to the zero cross and control circuitry and configured to generate delayed timing signals based upon the zero crossings and system control variables, and drive control circuitry coupled to the digital delay circuitry and configured to generate drive signals for the second set of solid state switches based upon the delayed timing signals, wherein the second set of solid state switches is switched at times that do not correspond to the zero crossings of the AC power;
a means for combining DC power from the first and second sets of switches and for applying the DC power to a load.

19. The system of claim 18, wherein the solid state switches are silicon controlled rectifiers.

20. The system of claim 18, wherein the AC power signal has a frequency of 50 Hz or 60 Hz.

21. The system of claim 18, wherein each set of switches includes 6 switches, and the drive signals from the second set of switches are delayed by 30 degrees with respect to the drive signals for the first set of switches.

22. The system of claim 18, wherein the delay line device phase shifts the drive signals for the second set of switches with respect to the drive signals for the first set of switches.

23. The system of claim 18, wherein the delay line device is synchronized to the AC power by phased lock loop circuitry.

24. A system for controlling a motor, comprising:
substantially identical first and second sets of solid state switches controllable to convert AC power to DC power;
means for generating drive signals for the first set of switches based upon zero crossings of the AC power;
means for generating drive signals for the second set of switches delayed in time with respect to the drive signals for the first set of switches, such that the second set of switches is switched at times that do not correspond to the zero crossings of the AC power; and
means for combining DC power from the first and second sets of switches and for applying the DC power to a load.

25. The system of claim 24, wherein the means for generating drive signals for the first set of switches detects zero crossings and generates the drive signals based upon the zero crossings and system control variables, and the means for generating drive signals for the second set of switches generates delay signals based upon the zero crossings and system control variables and generates the drive signals for the second set of switches based upon the delay signals.

* * * * *